United States Patent
Stumpf et al.

(10) Patent No.: US 7,815,988 B2
(45) Date of Patent: Oct. 19, 2010

(54) JOINING ELEMENT AND METHOD FOR ITS ATTACHMENT ON A SURFACE

(75) Inventors: Michael Stumpf, Bielefeld (DE); Gerson Meschut, Bielefeld (DE); Torsten Draht, Schloβ Holte (DE); Gudrun Weigel, Kaufering (DE); Christian Walther, Landsberg/Lech (DE)

(73) Assignees: Bollhoff Verbindungstechnik GmbH, Bielefeld (DE); DELO Industrieklebstoffe GmbH, Landsberg Am Lech (DE)

( * ) Notice: Subject to any disclaimer, the term of this patent is extended or adjusted under 35 U.S.C. 154(b) by 629 days.

(21) Appl. No.: 11/529,908

(22) Filed: Sep. 29, 2006

(65) Prior Publication Data

US 2007/0114227 A1    May 24, 2007

(30) Foreign Application Priority Data

Oct. 4, 2005   (DE) .................. 10 2005 047 469
Mar. 17, 2006  (DE) .................. 10 2006 012 411
Sep. 19, 2006  (EP) .................. 06019552

(51) Int. Cl.
    *B32B 9/00* (2006.01)
(52) U.S. Cl. .............. 428/40.1; 428/139; 428/40.9; 156/344; 248/225.21
(58) Field of Classification Search ........... 428/139, 428/40.1, 40.9; 156/344; 248/225.21
    See application file for complete search history.

(56) References Cited

U.S. PATENT DOCUMENTS

| 3,532,316 | A | | 10/1970 | Mathes |
| 3,535,481 | A | | 10/1970 | Korb |
| 4,338,151 | A | * | 7/1982 | Hutter, III .................. 156/344 |
| 4,355,222 | A | | 10/1982 | Geithman et al. |
| 4,390,576 | A | * | 6/1983 | Hutter, III .................. 428/40.1 |
| 4,778,702 | A | * | 10/1988 | Hutter, III .................. 428/40.9 |
| 4,830,588 | A | | 5/1989 | Zentner |
| 4,842,912 | A | | 6/1989 | Hutter, III |
| 6,237,886 | B1 | * | 5/2001 | Katsumata et al. ..... 248/225.21 |
| 6,773,780 | B2 | * | 8/2004 | Hutter, III .................. 428/40.1 |
| 7,413,790 | B2 | * | 8/2008 | Hutter, III .................. 428/139 |
| 2004/0112531 | A1 | | 6/2004 | Bogert et al. |

FOREIGN PATENT DOCUMENTS

| DE | 24 45 504 | | 4/1975 |
| DE | 28 41 449 | | 4/1979 |
| DE | 28 41 813 | | 4/1979 |
| DE | G 77 22 894.5 | | 2/1982 |
| DE | 35 18 946 | A1 | 11/1986 |
| DE | 40 14 200 | A1 | 11/1990 |
| DE | 42 04 365 | A1 | 9/1992 |
| DE | 44 16 884 | A1 | 11/1995 |

(Continued)

*Primary Examiner*—Richard E Chilcot, Jr.
*Assistant Examiner*—Chi Nguyen
(74) *Attorney, Agent, or Firm*—Seyfarth Shaw LLP

(57) ABSTRACT

A joining element and a method for attaching the joining element on a surface of a component are disclosed. The joining element comprises a sleeve-shaped accommodation part for the accommodation of an element to be attached in the interior of the accommodation part. A flange-type extension having an indentation is provided wherein said indentation can be filled with suitable means of attachment for mounting the joining element onto surface.

17 Claims, 3 Drawing Sheets

FOREIGN PATENT DOCUMENTS

| | | |
|---|---|---|
| DE | 297 22 126 U1 | 3/1998 |
| DE | 198 19 054 A1 | 11/1999 |
| DE | 100 00 355 A1 | 7/2001 |
| DE | 100 12 976 A1 | 9/2001 |
| DE | 203 00 624 U1 | 4/2003 |
| DE | 698 13 827 T2 | 2/2004 |
| DE | 103 59 466 A1 | 7/2004 |
| DE | 10359466 A1 | 7/2004 |
| DE | 696 34 030 T2 | 5/2005 |
| DE | 10 2004 012 786 A1 | 9/2005 |
| EP | 0 219 217 B1 | 4/1990 |
| EP | 0 403 276 A2 | 12/1990 |
| EP | 0504957 A3 | 9/1992 |
| EP | 0 900 944 A1 | 3/1999 |
| EP | 1 159 363 B1 | 4/2003 |
| EP | 06 019 552.6 | 9/2006 |
| FR | 1 405 668 | 5/1965 |
| GB | 2119810 A | 11/1983 |
| WO | WO 01/81774 A1 | 11/2001 |
| WO | WO 2006/032954 A1 | 3/2006 |
| WO | WO 2006/032955 A1 | 4/2006 |

* cited by examiner

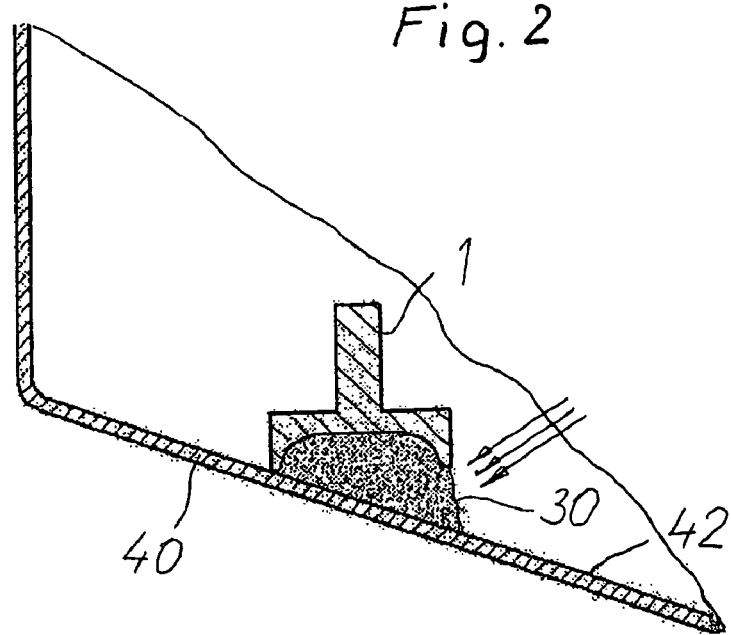
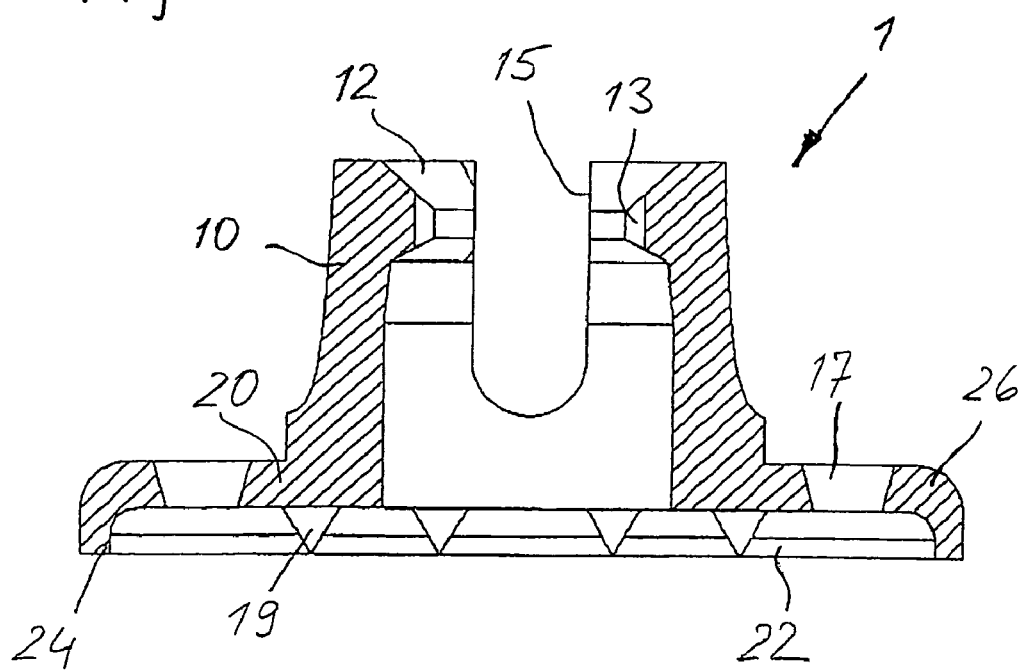

JOINING ELEMENT AND METHOD FOR ITS ATTACHMENT ON A SURFACE

FIELD OF THE INVENTION

The present invention relates to a joining element and a method for its attachment on a surface.

BACKGROUND OF THE INVENTION

Various applications, for example in the field of computers, mobile communications technology or in automobile manufacture require joining elements which permanently or detachably connect different parts to each other. Known joining elements frequently penetrate the components or are fused into their surfaces. However, this results in an unattractive appearance of the component surface.

It is additionally a disadvantage when rear markings, sink marks or dents are necessary for the connection of components. In this connection it is also not acceptable when for example the attachment of joining elements results in color changes of the component material.

Therefore it is the object of the present invention to provide a joining element and a method for its attachment on a component surface with which simultaneously a reliable connection and an acceptable appearance of the connection can be realized.

SUMMARY OF THE INVENTION

The present invention comprises a joining element for attachment on a surface a curing element, with whose support the joining element is attached on the surface, as well as a method for the attachment of the above-named joining element. Advantageous designs and improvements of the present invention arise from the following description, the drawings and the attached claims.

The joining element comprises a sleeve-shaped accommodation part, which exhibits in its interior a component of a positive and/or non-positive connection to be produced with an element to be attached, in particular a thread or a snap-on element, a flange-like extension connecting to the accommodation part with an indentation on the side turned away from the accommodation part and fillets on the side turned toward the accommodation part, which are designed in such a way that the joining element can be attached to the surface by filling the indentation with a suitable means of attachment and stiffness cracks in the flange-like extension can be reduced.

The above joining element exhibits an inverted T-shaped form, in which the broader piece serves the purpose of attachment of the joining element on the surface. The broader piece, which provides a sufficient seat opposite the surface of a component, is combined with a sleeve-shaped accommodation part. The sleeve-shaped accommodation part is preferably constructed like a hollow cylinder, so that the interior of the hollow cylinder, in particular the inner surface, can be used for the production of a desired connection with an additional component. This desired connection is for example a positive or non-positive connection or a combined positive and non-positive connection. The broader piece of the T-shaped joining element in addition exhibits an indentation for the support of the connection to the surface of a component, which can be filled with a means of attachment, for example adhesive. The flange-like extension of the joining element is placed on the surface for attachment and is therefore exposed to loading. This loading results in temporary deformations of the flange-like extension, whose mechanical stresses load the joining element. In order to limit this loading of the joining element so that a destruction of the joining element during placement on the surface is prevented, the flange-like extension exhibits fillets on the side turned toward the accommodation part. These fillets prevent stiffness cracks in the accommodation part so that in this way mechanical stress concentrations are reduced or even prevented.

In accordance with a preferred embodiment, thermosetting, light curing adhesive is placed on the surface or in the indentation and subsequently cured by means of a concerted lighting and heating of the indentation, the adhesive or the entire joining element. In accordance with a further preferred embodiment of the joining element a connection opening exists between the indentation and the interior of the sleeve-shaped accommodation part. Excess adhesive or close air can exit the interior of the indentation through this opening.

In accordance with a further embodiment of the joining element according to the invention its flange-like extensions comprise openings, in which the means of attachment, preferably the thermosetting, light curing adhesive, can be held in the formation of a positive locking between the flange-like extension and the means of attachment. It is additionally preferred to provide these and/or further openings in the flange-like extension which are arranged and formed in such a way that light can be radiated into the indentation of the flange-like extension. This light, which for example is purposefully directed to the openings with the help of fiber optic light cables, exposes the adhesive in the indentation to light, as a result of which a curing process is initiated and preferably a presetting of the joining element on the surface is achieved.

The present invention comprises in addition a curing element for the curing of a means of attachment cured by heat in combination with the above described joining element, which can be attached via the heating of the curing element and a suitable means of attachment within the indentation on a surface, while the curing element exhibits the following features: a body in which an electrical hollow coil for the generation of a magnetic field is held, a ferrite core which is located within the hollow coil in order to align the magnetic field so that by application of an electric alternating current voltage to the hollow coil a work piece adjacent to the curing element which is made of metal, in particular a surface of a component or a joining element, can be heated. With the help of the generated heat the adhesive located in the indentation of the joining element is hardened. The electric coil within the curing element is preferably constructed as a hollow coil, i.e., it consists of a metallic pipe rolled in coil form. A coolant is conducted through this pipe in order to reduce a heating up of the curing element.

The present invention comprises in addition a method for the attachment of the above named joining element on the surface of a component. This method comprises the following steps: Filling of the indentation with a dual curing adhesive or the application of the dual curing adhesive to the surface, exposure of the dual curing adhesive to the light of a selected spectral range, placement of the joining element on the surface and supply of heat to the dual curing adhesive, so that by means of the curing of the dual curing adhesive the joining element can be attached on the surface. The attachment method according to the invention is variable in such a way that the dual curing adhesive is applied either in the indentation of the joining element or on the place of the surface to which the joining element will be later attached. Subsequently the adhesive is exposed to light in order to initiate the curing process of the dual curing adhesive. That means that a hardening of the dual curing adhesive is first achieved in dependency on the energy supplied via the light. If the joining element is placed on the surface within this phase, a presetting of the joining element on the surface can be achieved.

The above described presetting creates the prerequisite for an additional preferred step of the attachment method. This comprises an intermediate processing of the preset joining element, such as for example a transporting of the surface with joining element and/or a cleansing of the surface with joining element.

In accordance with a further preferred embodiment during the attachment method the surface with joining element is transferred to an oven for heating or heat is generated via a magnetic alternating field within the joining element provided it is made of metal or exhibits a metallic part. It is also conceivable to supply the heat to the dual curing adhesive between joining element and surface via heat and/or blowers. With the help of this heat the dual curing adhesive is cured for the attachment of the joining element on the surface.

In accordance with a further embodiment of the attachment method according to the invention, prior to the final curing of the dual curing adhesive by means of heat a preforming of the dual curing adhesive takes place. With the help of this preforming the dual curing adhesive is in a geometric form which supports a desired orientation and/or arrangement of the joining element on the surface. In this connection it is also preferred that the dual curing adhesive be exposed to light prior to the preforming in such a way that a viscosity increase of the adhesive begins, which supports the preforming and the retention of the generated preforming of the adhesive. Joining elements are on this basis for example permanently attached to sloping surfaces. The means of attachment or the adhesive, which for this application is not fluid in its consistency but is malleable, hence provides the constructive base for the desired orientation between component surface and joining element.

The above steps of the method are preferably supplemented by a cleansing of the surface prior to the positioning of the joining element and by a calibration of an electrical supply of the curing element. The calibration relates for example to the alternating current voltage, a frequency and duration of connection of the alternating current voltage, so that quantity of heat required for the curing of the means of attachment can be purposefully adjusted.

BRIEF DESCRIPTION OF THE DRAWINGS

The preferred embodiments of the present invention will be described in greater detail with reference to the accompanying drawing.

FIG. 2 shows a diagrammatic representation of the attachment of the joining element on an oblique component.

FIG. 3 shows a transverse section of a modified embodiment of a joining element.

DETAILED DESCRIPTION OF THE PREFERRED EMBODIMENTS

Figure 1:
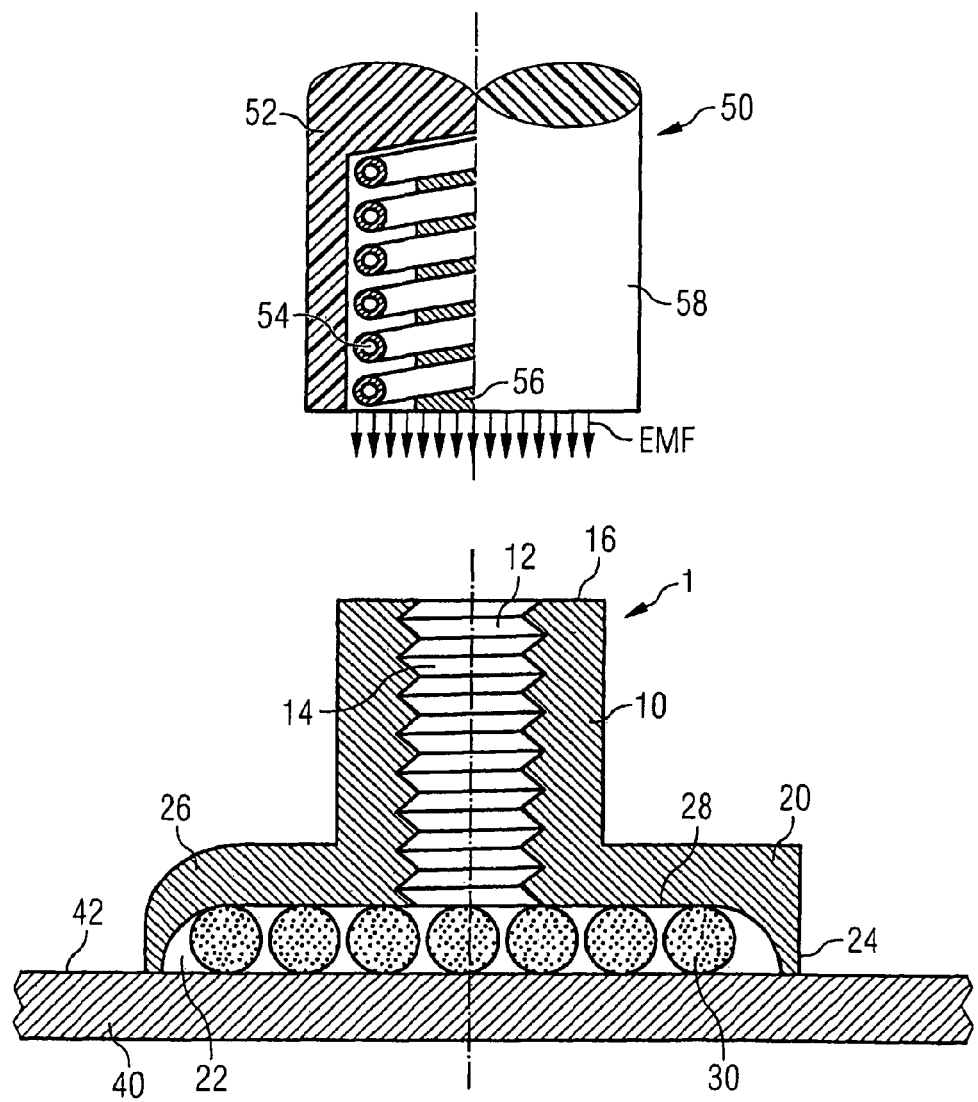
FIG. 1 shows a diagrammatic representation of the joining element and of the curing element, which are partially shown as a sectional drawing.

The accompanying FIG. 1 shows as an example a thin-walled component 40, to which the joining element 1 is attached. In accordance with different fields of application the component 40 is made of sheet metal, plastic or glass and is used among other things in mobile telephones, computers, motor vehicles and the like. In spite of the attachment of the joining element 1 on the surface 42 of the component 40 the outward appearance of the component 40 is not disturbed. The joining element 1 is namely connected to the component 40 in such a way that no openings, boreholes, material accumulations, dents, sink marks, color changes in the material, marks or the like occur or are necessary.

As one can see with the help of FIG. 1, the attachment element 1 has an inverted T-shaped form which is formed by a sleeve-shaped accommodation part 10 and by a flange-like extension 20. The accommodation part 10 and the extension 20 are integrally connected to each other or are connected in another way. Corresponding to the stability requirements of the attachment element 1 the accommodation part 10 and the extension 20 are made of metal or a plastic with a metal part whose use will become clear from the additional description.

The sleeve-shaped accommodation part 10 serves the purpose of holding an element to be attached (not shown) in its interior 12. To this purpose the interior 12 of the accommodation part 10 is preferably shaped in such a way that it forms a positive or non-positive connection or a combined positive and non-positive connection with the element to be attached. Exemplary designs of the interior 12 would be a thread 14, such as an internal thread or an external thread, or a snap-on element (compare FIG. 3). The connection provided with the help of the sleeve-shaped accommodation part 10 can consequently be of detachable or permanent nature.

The flange-like extension 20 joining to the accommodation part 10 comprises an indentation 22, which is limited by the borders 24. In attached state of the joining element 1 the borders 24 rest against the component 40 on the component surface 42 in such a way that within the indentation 22 a closed space is formed. Consequently the borders 24 are perfectly adapted to the surface 42. This space is limited by the borders 24, the surface 42 and the inner trend 28 of the indentation 22.

The hollow space formed by the indentation 22 serves the purpose of holding a suitable means of attachment so that this means of attachment produces a reliable connection between the joining element 1 and the component 40. Such a means of attachment 30 is preferably adhesive, which is held in it by the boundary of the interior and which in spite of this reliably attaches the joining element 1 on the component 40. In accordance with a preferred embodiment the indentation 22 is filled with thermosetting and light curing adhesive for the attachment of the joining element 1, whose use will be described in greater detail in the further course of the description. The light/heat curing of the adhesive can take place by the melting of a solid curing agent with an increase in temperature. It is also possible to use the acceleration of chemical reactions with an increase in temperature and consequently start the polymerization of the adhesive. Additionally, thermal initiators can be used, which generate active polymerization starters in the case of increases in temperature. Radiation curing adhesives can also be used, which polymerize both radically as well as cationically. In this connection the initiating step takes place by absorption of radiation in a photoinitiator, which in subsequent processes generates the required chemical species as the initiator of polymerization. Both mechanisms are reduced to practice in one recipe, as a result of which dual curing adhesives are formed. Examples of such adhesives are materials taking epoxy resins, acrylates and silicones as a basis.

Since after placement of the joining element 1 on the surface 42 of the component 40 the interior of the indentation 22 would be closed, a volume of adhesive exceeding the interior of the indentation 22 could only emerge from the indentation 22 with difficulty and would in this way prevent an attachment of the joining element 1. For this reason, in accordance with one embodiment a connection between the indentation 22 and the interior 12 of the sleeve-shaped accommodation part 10 is provided, through which an excessive volume of adhesive could exit the interior of the indentation 22. Additionally, the close air in the joining process can leave the interior of the indentation 22 through this opening. Only in this way is there a reliable guarantee that the surfaces of the interior are sprinkled all over with adhesive and once determined mechanical strength properties of the joining element-adhesive-connection will be permanently and reliably achieved in a serial production. At the same time decisive advantages for the joining process result from this embodiment, since the applied adhesive quantities can have a greater quantity tolerance. Thus excess material is not squeezed out between the borders 24 and the surface 42, which would result in an unclean appearance, but rather it escapes through the connection opening.

In accordance with a further embodiment the flange-like extension 20 comprises fillets 26 on its exterior, with whose help stiffness cracks in the flange-like extension 20 are lowered or even completely prevented. For example, if the flange-like extension 20 is deformed upon placement of the joining element 1 on the surface 42, stress concentrations occur precisely in the locations of stiffness cracks. These can result in the failure of the joining element 1 or its damage.

As mentioned above, the flange-like extension 20 is preferably made of the same material as the sleeve-shaped accommodation part 10. The sleeve-shaped accommodation part 10 and the flange-like extension 20 are preferably made of metal or a plastic with a metal part so that the joining element 1 is heated up under the effect of an electromagnetic alternating field. It is also conceivable to manufacture only the flange-like extension 20 out of metal or a plastic with a metal part, since only they have to provide heat for the thermosetting adhesive 30 located in the indentation 22 via an acting electromagnetic alternating field. Consequently the flange-like extension 20 serves as a combined heat conductor and "heat generator". The above functions of accommodation part 10 and extension 20 require that these components also be made of a heat-resistant material.

In accordance with a further embodiment the joining element 1 is not attached with the help of the curing element 50 (see below), but rather in the oven, in a heat chamber or by heating via a blower or heat radiator and the corresponding curing of the dual curing adhesive (see also below). In this case along with metal, plastics with and without a metal part are preferred as materials of the joining element 1.

A modified embodiment of the joining element 1 is shown in FIG. 3. In the case of this joining element 1 the sleeve-shaped accommodation part 10 is constructed as a snap-on element with a snap-on projection 13 extending inward and opposing longitudinal slots 15 for increasing the flexibility of the accommodation part 10. The flange-like extension 20 in turn has fillets 26 on its exterior, with whose help stiffness cracks in the flange-like extension 20 are reduced or even completely prevented. In the case of this embodiment the flange-like extension 20 is provided with a plurality of openings 17 in the form of conical holes, into which the means of attachment (adhesive) can flow in the heating process, in order to form a positive locking ("closing head") between the joining element 1 and the means of attachment 30. It is also preferable to provide the openings 17 in number, arrangement and form in such a way that light can be irradiated via these openings 17 into the indentation 22 of the flange-like extension 20. Since there is preferably dual curing adhesive within the indentation 22, a curing is initiated by the admission of light via the openings 17. On this basis the joining element already positioned on the surface 42 is preset by the admission of light. The admission of light occurs preferably via optical waveguides, which are arranged close to the openings 17.

The flange-like extension 20 is additionally provided with a plurality of projections 19 extending into the indentation 22, which are conical in the exemplary embodiment shown. The projections 19 extend to the plane of the outer border 24, so that during the joining operation they rest against the surface 42 of the component 40 and together with the border 24 serve as spacers. Hence they act in a way as "energy directors", which provide a uniform thickness of the means of attachment (adhesive). An embodiment is also possible in which the border 24 is dispensed with and only projections serving as spacers are provided.

As already mentioned, the joining element 1 can also be manufactured of plastic. Particularly advantageous is the use of a transparent plastic, such as PC or PMMA for example. This supports the use of a thermosetting, light curing dual curing adhesive, which is preset by means of light penetrating the joining element 1 and is cured by heat. In this way the range of application of dual curing adhesive systems as a means of attachment 30 is considerably expanded.

The use of plastic as a material for the joining element has in addition the advantage that the joining element can be manufactured in simple manner using forming technology, in particular by means of injection molding.

Figure 4:
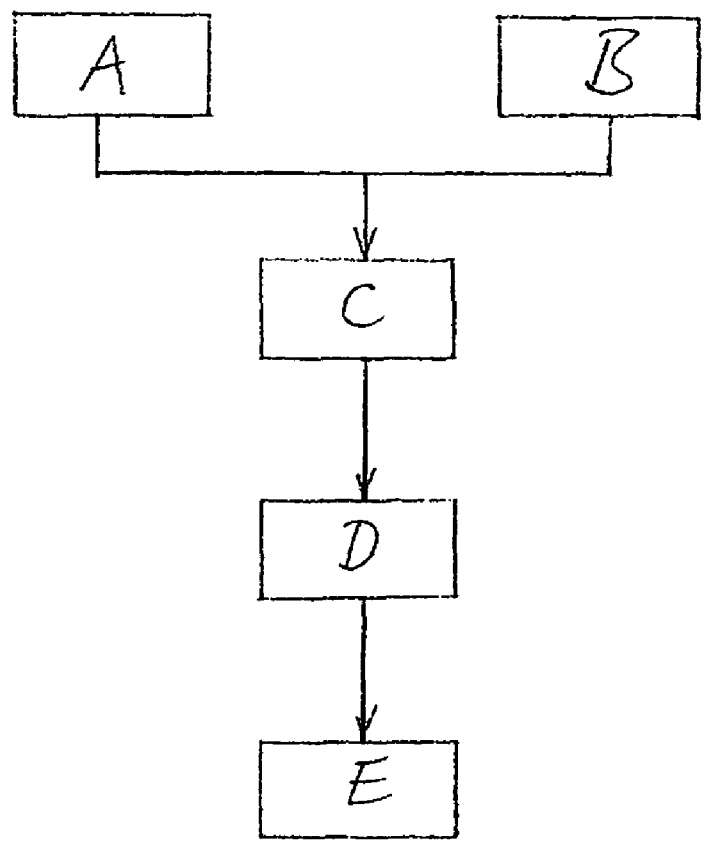
FIG. 4 shows a flow chart of a preferred embodiment of the attachment method according to the invention.

After a cleansing of the surface 42 of the component 40 and of the indentation 22 of the joining element 1, provided this is necessary in dependency on the respective material, a thermosetting, light curing dual curing adhesive 30 is applied in the indentation 22 or on the surface 42. The adhesive 30 is selected corresponding to the respective technical requirement. This requirement is for example given by specification of the minimum values of the strength, resistance to aging and temperature resistance. The application of the dual curing adhesive 30 takes place optionally using a known dosing technique in the indentation 22 (Step A) or on the surface 42 of the component 40 (Step B in 20 FIG. 4).

After the dual curing adhesive 30 has been applied (Steps A; B), it is exposed to light from a selected spectral range. By means of the light energy is supplied to the dual curing adhesive 30, so that a polymer reaction starts in the dual curing adhesive 30. This reaction, corresponding to the energy input, results in an increasing viscosity or in an increasing curing degree of the dual curing adhesive 30. If one irradiates light in a spectral range of ultraviolet Aradiation (ca. 320-400 nm), ultraviolet B-radiation (ca. 280-320 nm) and visible light, preferably in a range of 280-800 nm and additionally preferably in a range of 320-550 nm, the viscosity increases abruptly due to the light-initiated precuring of the dual curing adhesive 30. The above mentioned irradiation or the admission of light takes place preferably over a time period of 1-10 seconds.

Due to the light-initiated precuring the dual curing adhesive 30 is processing-proof, that means the joining element 1 can be placed on the surface 42 and is so solid there, that subsequently the surface 42 with joining element 1 can be transported, cleansed or processed in a different manner. The dual curing of the adhesive 30 hence is also accompanied by simplifications in the entire manufacturing process of the surface 42 with joining element 1, since not all manufacturing steps have to be performed at one location. In summary, the exposure to light thus initiates a curing of the dual curing adhesive 30, so that upon placement the joining element 1 is preset on the surface 42.

After the exposure to light, during the placement (Step D) of the joining element 1 on the surface 42 the joining element 1 is manually or automatically positioned on the surface 42 of the component 40 with the help of a positioning device. In accordance with one embodiment a pressing of the joining element 1 on the surface 42 also takes place by means of this positioning device.

It is in addition preferable to provide the surface 42 or the indentation 22 with dual curing adhesive 30 and subsequently place the joining element 1 on the surface 42. After that the presetting is initiated by the admission of light, by purposeful irradiation through the openings 17 (see above) into the indentation 22 and onto the dual curing adhesive 30.

A further embodiment and use of the joining element 1 is schematically represented in FIG. 2. The joining element 1 in this embodiment can be attached on an inclined plane 42 of a component 40 without requiring costly and expensive devices for the placement of the joining element 1. The positioning of the joining element 1 in a desired orientation to the inclined plane 42 of the component 40 is guaranteed with the help of the dual curing adhesive 30. For example, FIG. 2 shows a perpendicular arrangement of the joining element 1 at an acute angle to the inclined plane 42 of the component 40. This arrangement uses an adhesive wedge 30 formed according to the alignment requirements between the inclined plane 42 of the component 40 and the joining element 1. It is also conceivable to put the adhesive 30 in any other random geometric shape which secures a desired alignment. In order to prevent a flowing of the dual curing adhesive 30 and make it formable, it is preferably exposed to light so that its viscosity can be purposefully adjusted. It is also preferable to use adhesive 30 which exhibits a formable consistency before light is irradiated.

In a first stage the dual curing adhesive or adhesive wedge 30 is preset to a specified wavelength by light. For example, if one first irradiates with the light of a suitable wavelength, in particular synchronized to the photoinitiator being used, onto the adhesive 30, in this way a quick and effective presetting of the joining element 1 takes place on the inclined plane 42. Subsequently the adhesive 30 is then completely cured by heat in a second stage. Based on the presetting the component 40 with joining element 1 can be transported to a different location prior to the complete curing. It is also conceivable to perform other random treatments whose loading does not detach the presetting connection between component 40 and joining element 1.

In accordance with another alternative a plurality of joining elements 1 could first be preset on the plane 42 by light. This opens up the possibility of removing incorrectly positioned and preset joining elements 1 again with low expenditure and damage and repositioning and presetting them. In addition, a plurality of joining elements 1 can first be preset. Subsequently the adhesive of this plurality of joining elements 1 is simultaneously cured with a plurality of curing elements 50 or jointly cured in the oven or by some other supply of heat. In this way time, costs and several processing steps are saved.

By means of the supplying of heat to the dual curing adhesive 30 (Step E) already mentioned above said adhesive is cured and the joining element 1 is attached on the surface 42. With the help of the above named light-initiated presetting the curing can take place directly after the presetting or time displaced if intermediate processing of the preset joining element on the surface 42 is to be performed. The complete curing of the dual curing adhesive 30 by the supply of heat occurs preferably at a time interval of 3 to 30 minutes and in a preferred temperature range of 120° C. to 150° C. In accordance with one embodiment the heat is supplied in an oven in which the surface 42 with joining element 1 is arranged. In accordance with a further embodiment the heat is supplied via a blower or heat radiator. Additionally it is preferable to supply the heat by means of a curing element 50.

As one can see in FIG. 1, the curing element 50 preferably consists of a plastic body 58, in which a hollow coil 54 is held. This electrical hollow coil 54 serves the purpose of generation of a magnetic field when a corresponding electric voltage is connected to it. The hollow coil 54 consists for example of a copper pipe or another electric conductive material. A coolant flows through the pipe of the hollow coil 54, for example water, in order to prevent or at least limit a heating up of the curing element 50. In order to generate a magnetic field with the help of the hollow coil 54, a ferrite core 56 is arranged within the hollow coil 54.

The sharply focused and directed electromagnetic field EMF generated by an alternating current voltage connected to the hollow coil 54 is transmitted by application of the curing element 50 to the joining element 1 via the junction 16. The curing element 50 acts as an external heat source similar to a laser pointer or a cylindrical welding tool and in a very short time heats up the adhesive 30 in the joint zone 28 and cures it.

In order not to overheat the dual curing adhesive 30 during this operation, the curing element is calibrated prior to use as an external heat source. Within the scope of the calibration of the curing element 50, an electric supply of the curing element 50, preferably the supplying alternating current voltage, the frequency of the alternating current voltage and the duration of connection of the alternating current voltage, are purposefully varied in order to record the heat quantity transmitted by the curing element 50. As soon as the determined heat quantity is known in dependency of the electrical supply of the curing element 50, the electrical supply of the curing element 50 can be optimally adapted to the used means of attachment 30, for example different types of thermosetting, light curing adhesive 30.

With the help of the curing element 50 and the heat supply via induction the above time domain for the heat supply and the maximum curing of the dual curing adhesive 30 can be reduced.

In dependency on the subsequent processing of the surface 42 with joining element 1 therefore the heat for complete curing of the dual curing adhesive 30 can be variably supplied. Hence it is also preferable to combine the curing of the dual curing adhesive 30 in the oven with a curing phase of a painting process or a processing operation requiring a similar heat.

We claim:

1. A joining element for attachment on a surface, the joining element comprising:

a sleeve-shaped accommodation part, having an interior with a component of a positive and/or non-positive connection to be produced with an element to be attached, in particular a thread or a snap-on element, and a flange-type extension connecting to the sleeve-shaped accommodation part with an indentation on a side turned away from the sleeve-shaped accommodation part and fillets on a side turned toward the sleeve-shaped accommodation part, wherein, said indentation has borders which limit said indentation and are constructed to rest on a surface so that a hollow space is formed within said indentation to hold an adhesive, said indentation and said fillets are designed such that the joining element can be attached to the surface by filling the indentation with an adhesive, stiffness cracks in said flange-type extension can be reduced, and said interior of said sleeve-shaped accommodation part is connected to said indentation in order to guarantee a deviation of the adhesive from said indentation into said interior of said sleeve-shaped accommodation part, and wherein said flange-type extension is provided with projections protruding into said indentation, contacting said surface.

2. The joining element in accordance with claim 1, wherein the flange-type extension comprises openings in which said adhesive can be held for the purpose of positive locking between said flange-type extension and said adhesive.

3. The joining element in accordance with claim 1, wherein said flange-type extension has openings which are arranged and formed in such a way that light can be irradiated into said indentation of said flange-type extension.

4. The joining element in accordance with claim 1, which is made of metal or another heat-resistant material with a metal part, so that it can be heated by an electromagnetic alternating field.

5. A curing element for curing a material by heat in combination with a joining element in accordance with claim 4, which can be attached on a surface via a heating of the curing element and an adhesive within said indentation, said curing element comprising:

a body in which an electrical hollow coil for the generation of a magnetic field is held, and a ferrite core which is located within the electrical hollow coil in order to align the magnetic field, wherein, by application of an electric alternating current voltage to the electrical hollow coil, a workpiece adjacent to the curing element, which is made of metal, in particular a surface of a component or a joining element, can be heated.

6. The curing element in accordance with claim 5, wherein a coolant can be conducted through said electrical hollow coil in order to reduce heating of the curing element.

7. The joining element in accordance with claim 1, which is made of a plastic which is in particular pervious to radiation in order to cure the means of attachment by radiation entry.

8. A method of attaching a joining element on a surface, the joining element having a sleeve-shaped accommodation part and an interior with a component of a positive and/or non-positive connection to be produced with an element to be attached, in particular a thread or a snap-on element, and a flange-type extension connecting to the sleeve-shaped accommodation part with an indentation on a side turned away from the sleeve-shaped accommodation part and fillets on a side turned toward the sleeve-shaped accommodation part, the method comprising the steps of:

filling the indentation with a dual curing adhesive, exposing the dual curing adhesive to light of a selected spectral range, placing the joining element on the surface, preforming the dual curing adhesive into a geometrical shape corresponding to a desired orientation between the surface and the joining element to be attached, and supplying heat to the dual curing adhesive to cure the dual curing adhesive and thereby attaching the joining element on the surface.

9. The method according to claim 8, wherein said step of exposing the dual curing adhesive to light initiates a curing of the dual curing adhesive, so that the joining element is preset with the step of placing the joining element on the surface.

10. The method according to claim 9, further comprising the step of intermediately processing the preset joining element, preferably by one of the steps of transporting and cleaning.

11. The method according to claim 8, further comprising one of the steps of:

transferring the surface with joining element to an oven for heat supply, and generating heat via a magnetic alternating field within the joining element, which is made of metal or which exhibits a metallic part.

12. The method according to claim 8, further comprising the step of manually or mechanically placing and pressing the joining element on the surface.

13. A method of attaching a joining element on a surface, the joining element having a sleeve-shaped accommodation part and an interior with a component of a positive and/or non-positive connection to be produced with an element to be attached, in particular a thread or a snap-on element, and a flange-type extension connecting to the sleeve-shaped accommodation part with an indentation on a side turned away from the sleeve-shaped accommodation part and fillets on a side turned toward the sleeve-shaped accommodation part, the method comprising the steps of:

applying a dual curing adhesive on the surface, exposing the dual curing adhesive to light of a selected spectral range, placing the joining element on the surface, preforming the dual curing adhesive into a geometrical shape corresponding to a desired orientation between the surface and the joining element to be attached, and supplying heat to the dual curing adhesive to cure the dual curing adhesive and thereby attaching the joining element on the surface.

14. The method according to claim 13, wherein said step of exposing the dual curing adhesive to light initiates a curing of the dual curing adhesive, so that the joining element is preset with the step of placing the joining element on the surface.

15. The method according to claim 14, further comprising the step of intermediately processing the preset joining element, preferably by one of the steps of transporting and cleaning.

16. The method according to claim 13, further comprising one of the steps of:

transferring the surface with joining element to an oven for heat supply, and generating heat via a magnetic alternating field within the joining element, which is made of metal or which exhibits a metallic part.

17. The method according to claim 13, further comprising the step of manually or mechanically placing and pressing the joining element on the surface.

* * * * *